US00RE45161E

(19) United States
(12) Reissued Patent
Westman et al.

(10) Patent Number: US RE45,161 E
(45) Date of Reissued Patent: Sep. 23, 2014

(54) METHOD AND APPARATUS FOR REGISTRATION OF A USER AS A SUBSCRIBER IN A COMMUNICATION NETWORK

(75) Inventors: Ilkka Westman, Helsinki (FI); Bernhard Honeisen, Zurich (CF)

(73) Assignee: Nokia Corporation, Espoo (FI)

(21) Appl. No.: 13/163,448

(22) Filed: Jun. 17, 2011

Related U.S. Patent Documents

Reissue of:
(64) Patent No.: 7,792,974
Issued: Sep. 7, 2010
Appl. No.: 10/473,795
PCT Filed: Jul. 13, 2001
PCT No.: PCT/EP01/08161
§ 371 (c)(1),
(2), (4) Date: Oct. 2, 2003
PCT Pub. No.: WO02/082731
PCT Pub. Date: Oct. 17, 2002

(30) Foreign Application Priority Data

Apr. 3, 2001 (DE) ..... 101 16 547

(51) Int. Cl.
*G06F 15/16* (2006.01)

(52) U.S. Cl.
USPC ..... 709/228; 709/227

(58) Field of Classification Search
USPC ..... 455/435.1; 709/222, 227, 228
See application file for complete search history.

(56) References Cited

U.S. PATENT DOCUMENTS

| | | | | |
|---|---|---|---|---|
| 5,764,730 | A * | 6/1998 | Rabe et al. | 455/403 |
| 6,108,540 | A * | 8/2000 | Sonti et al. | 455/433 |
| 6,546,247 | B1 * | 4/2003 | Foti et al. | 455/433 |
| 6,603,969 | B1 * | 8/2003 | Vuoristo et al. | 455/433 |
| 6,672,775 | B1 * | 1/2004 | Narayanaswami | 709/219 |
| 7,206,280 | B1 * | 4/2007 | Khan et al. | 370/216 |
| 2001/0024161 | A1 * | 9/2001 | Huang et al. | 340/539 |
| 2001/0049790 | A1 * | 12/2001 | Faccin et al. | 713/185 |
| 2002/0037723 | A1 * | 3/2002 | Roach | 455/435 |
| 2002/0141381 | A1 * | 10/2002 | Gawargy et al. | 370/352 |
| 2002/0167946 | A1 * | 11/2002 | Gallant | 370/389 |

FOREIGN PATENT DOCUMENTS

| | | | |
|---|---|---|---|
| WO | WO 99/27722 | * | 6/1999 |
| WO | WO-99/27722 A2 | | 6/1999 |
| WO | WO 00/79756 A2 | | 12/2000 |

OTHER PUBLICATIONS

Berners-Lee, et al., RFC 2396, "Uniform Resource Identifiers (URI): Generic Syntax", Xerox Corporation, Aug. 1998.
Aboba, et al., RFC 2486, "The Network Access Identifier", WorldCom Advanced Networks, Jan. 1999.
Handley, et al., "SIP: Session Initiation Protocol", IETF RFC 2543, Mar. 1999.

(Continued)

*Primary Examiner* — Derrick Ferris
*Assistant Examiner* — Scott M Sciacca
(74) *Attorney, Agent, or Firm* — Mintz, Levin, Cohn, Ferris, Glovsky & Popeo, P.C.

(57) ABSTRACT

A method and apparatus for registering a user as a subscriber in a communication network. The method includes transmitting a registration message which defines an identity of the user to the communication network. The method also includes providing in the registration message a header field for defining at least one other identity of the user as a subscriber. The method also includes performing a one-by-one registration based on an identity information stored at a terminal device, whereby the identity information defines at least one other identity of the user as a subscriber. Thus, the user or subscriber can register some or all of his public identities at once with one registration procedure, allowing the user to utilize his identities by grouping public identities under user profiles or under private identities, while preventing unwanted calls.

39 Claims, 4 Drawing Sheets

(56) References Cited

OTHER PUBLICATIONS

Schulzrinne, et al., "The Session Initiation Protocol: Protocol: Providing Advanced Telephony Services Acros the Internet", Bell Labs Technical Journal, vol. 3, No. 4, Oct. 1998,—Dec. 1998, pp. 144-160.
ITU-T Recommenation H.323—Packet-based Multimedia Communications Systems, Sep. 1999, pp. 1-129.
"SIP: Session Initiation Protocol", Handley et al, IETF RFC 2543, Mar. 1999, XP002173547.
"The Session Initiation Protocol: Providing Advanced Telephony Services Across the Internet", Schulzrinne et al, Bell Labs Technical Journal, vol. 3, No. 4, Oct.-Dec. 1998, pp. 144-160, XP002164648.
"True Number Portability and Advanced Call Screening in a SIP-Based IP Telephony System", IEEE Communications Magazine, vol. 37, No. 7, pp. 96-101, XP000835310.
ITU-T Recommendation H.323—Packet-based Multimedia Communications Systems, Sep. 1999, pp. 1-129, XP002166480.

* cited by examiner

METHOD AND APPARATUS FOR REGISTRATION OF A USER AS A SUBSCRIBER IN A COMMUNICATION NETWORK

Matter enclosed in heavy brackets [ ] appears in the original patent but forms no part of this reissue specification; matter printed in italics indicates the additions made by reissue.

*CROSS REFERENCE TO RELATED APPLICATION*

*This application is a reissue application of U.S. patent application Ser. No. 10/473,795, filed on Oct. 2, 2003, entitled "METHOD AND APPARATUS FOR REGISTRATION OF A USER AS A SUBSCRIBER IN A COMMUNICATION NETWORK," (issued as U.S. Pat. No. 7,792,974), which is a U.S. National Stage entry claiming benefit under 35 U.S.C. §371 of PCT/EP01/08161, filed Jul. 13, 2001. The contents of the aforementioned applications are hereby incorporated by reference in their entirety.*

FIELD OF THE INVENTION

The present invention relates to a method, terminal device and system for registering a user in a communication network, especially in a 3GPP (third generation partnership project) Internet Protocol (IP) Multimedia subsystem (IMS). In particular, this invention is directed to different ways to deal with the problem of registering multiple identities, which can be seen in the cases "one private identity", "one private identity but several user profiles", and "several private identities".

BACKGROUND OF THE INVENTION

A user equipment (UE) accessing IM core network (CN) subsystem services requires an IP address that is part of an IP addressing domain of a visited network IM CN subsystem. This is established using an appropriate PDP (Packet Data Protocol) context. For routing efficiency this context should be connected through a GGSN (General Packet Radio Services Gateway Support Node) in the visited network.

Every IM CN subsystem subscriber has a private identity assigned by the home network operator and used e.g. for registration, authorization, administration, and accounting purposes. This private identity is a unique global identity valid for the duration of the user's subscription with the home network and takes the form of a Network Access Identifier (NAI) as defined in the IETF (Internet Engineering Task Force) specification RFC 2486. The NAI for the private identity may contain the IMSI (International Mobile Subscriber Identity). The private identity is securely stored in the USIM (Universal Mobile Telecommunications System Subscriber Identity Module) and cannot be modified by the UE.

Furthermore, every IM CN subsystem subscriber has one or more public identities assigned by the home network operator and used by any user for requesting communications to other users. For example, these public identities may be indicated on a business card. Both telecom numbering and Internet naming schemes can be used to address users depending on the public identities allocated to the users. The public identities may take the form of a SIP URL (Session Initiation Protocol Uniform Resource Locator), as defined in the IETF specifications RFC 2543 and RFC 2396, or an E.164 number. At least one public identity is stored in the USIM.

In SIP as described e.g. in the IETF specification RFC 2543, each public identity is registered separately, as indicated in FIG. 1. Therefore, the registration of other subscriber identities requires additional registration procedures if a subscriber wishes to use multiple identities.

The subscriber may have several profiles that he would like to use separately e.g. business profile, private profile, chess club member profile etc. In the case "one private identity but several user profiles", as shown in FIG. 2, the public identities that belong to the same user profile are bundled together and therefore they are also administrated together. In the case "several private identities", as shown in FIG. 3, every user profile has its own private identity.

The subscriber registers with one of his public identities and lists all the other public identities that he wants to be registered with at the same time. When a subscriber has registered with one of his identities, he can use his other identities for outgoing calls without any further registration but he doesn't receive any calls with those identities. The subscriber can explicitly change an existing registration or make a new registration with whichever of his identities for incoming calls only, for outgoing calls only, or for both incoming and outgoing calls. He can make one or several registrations at a time.

Furthermore, the subscriber can register with one of his public identities specially indicating that all public identities should be registered, and all his public identities will be registered. As an option the subscriber can register without the mentioned indication, and all his public identities are registered by a default setting.

The subscriber may have several public identities. Normally, he registers with one public identity. If he wants to use another of his public identities e.g. to make a business call in the evening from home, he has to register with that identity before he can use it. It would be desirable to be able to register with all or with some of the public identities all together at the same time. After the registration, that public identity is valid also for incoming calls e.g. people may call home in business matters.

SUMMARY OF THE INVENTION

It is an object of the present invention to provide an improved registration mechanism for registering multiple identities of a subscriber in a communication network.

This object is achieved by a method according to any of claims 1, 5, 25 and 27, by a terminal device according to claim 31, and by a system according to claim 32.

Accordingly, three alternative ways how to clarify the administration and registration of public identities are presented by the invention.

Firstly, new optional header field is used in the registration message. As an alternative, the payload of the registration message can be used.

Secondly, the terminal may perform a one-by-one registration to all items stored e.g. in a list on the SIM or the USIM and/or memory of the terminal.

Thirdly, a default registration of at least one other identity of the user, stored in a subscriber database, may be performed based on a default setting. The at least one other identity may be comprised in a default set defined by the user. The default set may be defined via a web page or a terminal menu.

Additionally, a new parameter, header, flag or the like can be added to the registration message to convey the direction (incoming calls/outgoing calls/both) of the registration. To make several registrations at the same time, several fields or a separate header can be used. The registration message might also provide a mechanism to tell that all valid identities should be activated at the same time.

Private identities, user profiles and public identities may all be stored in a subscriber database, e.g. HSS. The client identity may be used as a link that binds together the private identities of one client.

The invention provides the advantage that only one registration is necessary in order to be able to use some or all public identities. This saves resources such as bandwidth and capacity, which is especially important on the air interface. Furthermore, only one registration is necessary in order to be able to use all identities for outgoing calls. The subscriber can explicitly administrate all his identities and decide whether he wants to allow incoming calls, outgoing calls or both. Only those identities are registered that are really needed. Identities may be given by different operators and/or organizations.

As a further advantage, the solution is (IETF) SIP compliant (extension to standard SIP) and backwards compatible.

Moreover, there may be limits in the Home Subscriber Server (HSS) within which the subscriber can allow and deny incoming and outgoing calls of his identities. Thereby, unwanted incoming calls can be prevented. For example the subscriber is allowed to receive incoming business calls always but not make any outgoing business calls in the evening or between certain time period (e.g. vacation).

Additionally, the invention provides a solution, which is easy to use because outgoing calls are allowed with whichever identity as default, if not denied in the master database in the HSS. Moreover, a special usage is possible with parameters.

In the case of "one private identity but several user profiles" a subscriber can administrate a couple of profiles instead of many individual E.164 and SIP URL.

In the case of "several private identities" a subscriber can administrate a couple of private identities instead of many individual E.164 and SIP URLs.

In addition, the subscriber is able to explicitly administrate all his public identities in a one by one registration according to his preferences. Regarding structural implementation thereof, the terminal device or user equipment used for registering the user in the communication network comprises a memory, e.g. the USIM, SIM or any other memory, for storing the identity information of the user, which defines an identity and at least one other identity of the user. Based on this identity information, a signaling function or unit performs or initiates a one-by-one registration according to the user's instructions.

BRIEF DESCRIPTION OF THE DRAWINGS

In the following, the present invention will be described in greater detail on the basis of preferred embodiments with reference to the drawing figures, in which.

DESCRIPTION OF THE PREFERRED EMBODIMENTS

Figure 1:
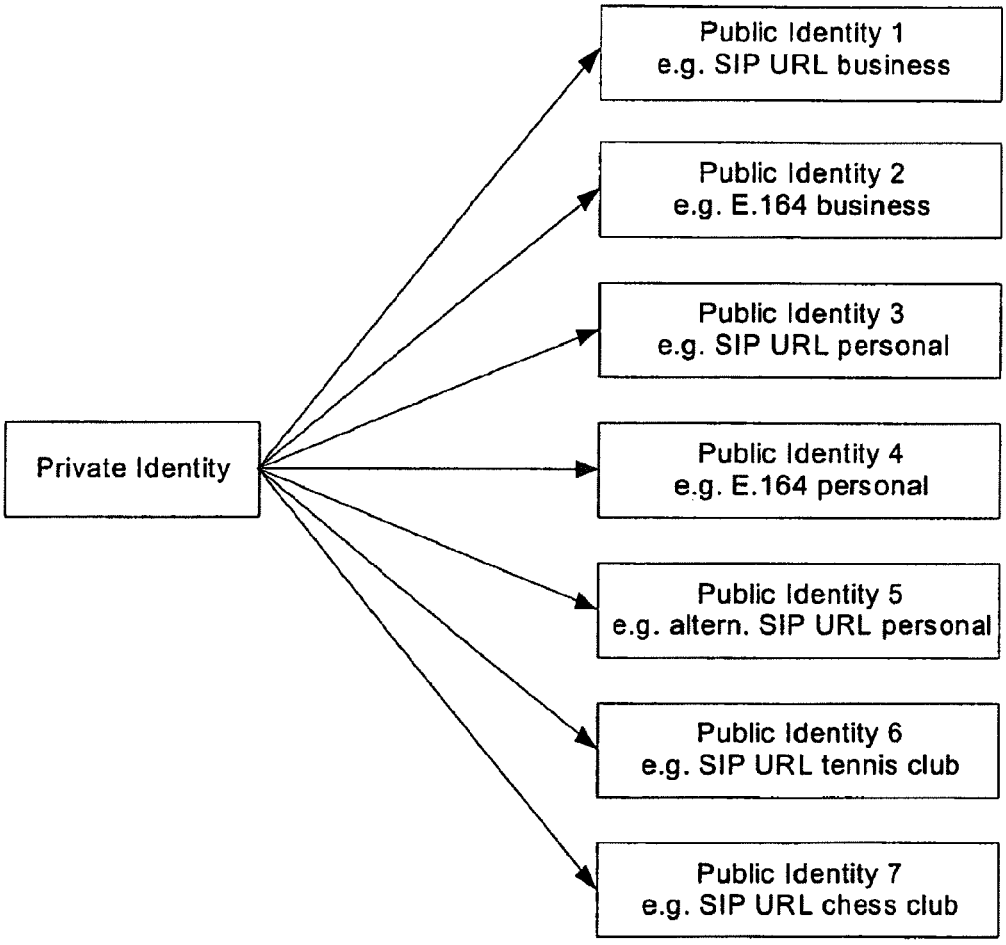
FIG. 1 shows a diagram indicating the case of "one private identity", where all public identities are bound to a single private identity.
Figure 2:
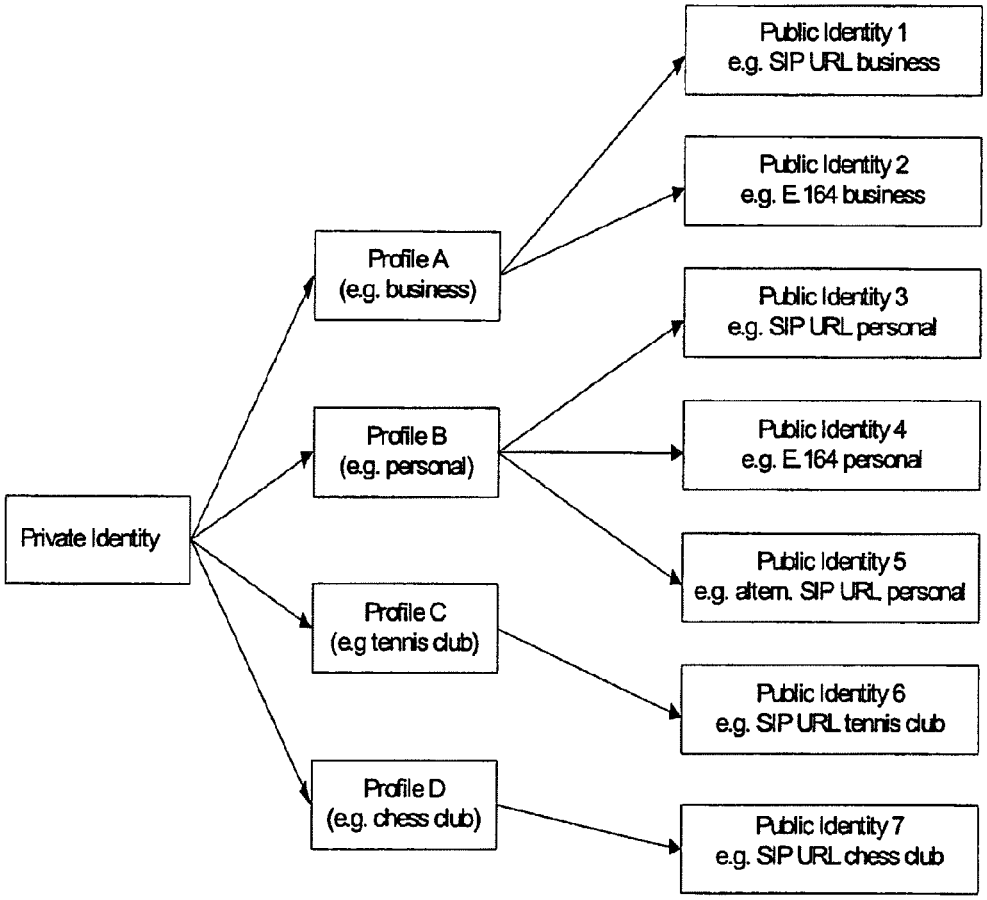
FIG. 2 shows a diagram indicating the case of "one private identity, but several user profiles", where public identities are bundled to profiles and therefore an additional profile layer is needed.
Figure 3:
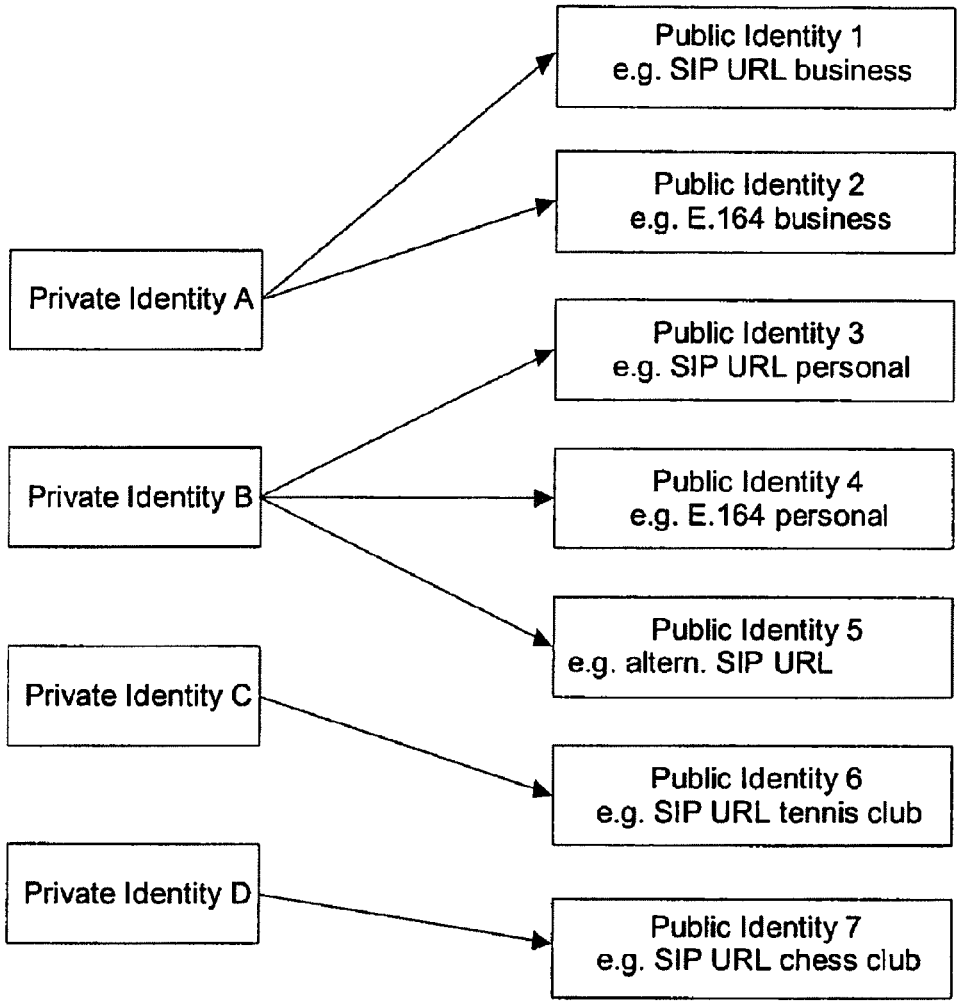
FIG. 3 shows a diagram indicating the case of "several private identities", where several public identities are bundled to several private identities and therefore an additional profile layer is not needed.
Figure 4:
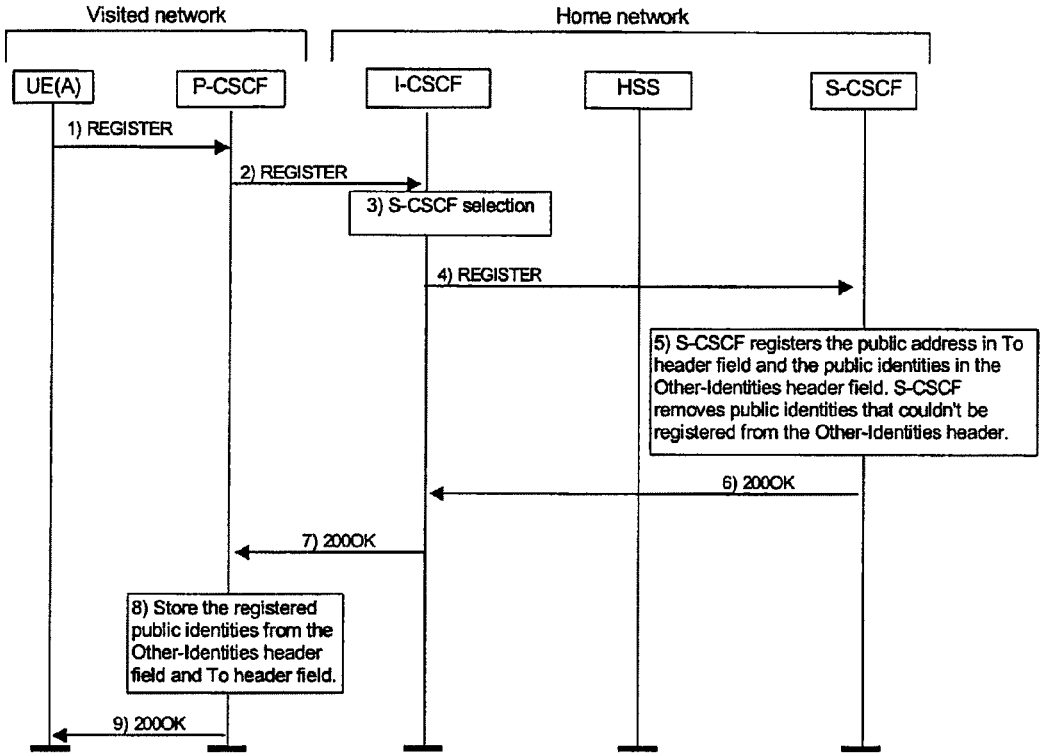
FIG. 4 shows a call flow diagram relating to an internet protocol (IP) registration, according to the preferred embodiments.

The preferred embodiments of the invention will now be described on the basis of an SIP registration procedure in a visited network, as indicated in FIG. 4.

The architecture is based on the principle that the service control for home subscribed services for a roaming subscriber is in the home network, e.g. the Serving Call State Control Function (S-CSCF) is located in the home network. When the subscriber roams to a visited network, the S-CSCF is located in the home network and the visited network supports a Proxy-CSCF (P-CSCF). The P-CSCF enables the session control to be passed to the home network based S-CSCF which provides the service control. Furthermore, one or more Interrogating-CSCFs (I-CSCFs) may be included in the signalling path to shield the internal structure of the concerned network from other networks.

In a first preferred embodiment, public identities are registered according to a specified user equipment indication. The user equipment, i.e. the user's terminal, sends one of the valid public identities in a "To" header field of the SIP REGISTER message and other identities in a new header field called "Other-Identities". The S-CSCF registers the public identities, contained in the "To" header field and the "Other-Identities" header field and returns the list of registered public identities in the "Other-Identities" header field. The P-CSCF stores the registered public identities for later use.

In step 1 of FIG. 4, a user equipment UE(A) initiates a registration procedure by issuing the REGISTER message to the P-CSCF. Besides the public address in the "To" header field of the REGISTER message, it wants to register at the same time also other public identities as listed in the new "Other-identities" header field of the REGISTER message. In the following an example for such a header is given:

| | |
|---|---|
| REGISTER | home_a.com SIP/2.0 |
| Via: | SIP/2.0/UDP 12.34.56::EF:5060 |
| From: | Private Identity <sip:245454555@home_a.com> |
| To: | Mary Blue <sip:Mary.Blue@home_a.com> |
| Call-Id: | 12345@ue_a.home_a.com |
| Cseq: | 1 REGISTER |
| Contact: | User_A <sip:ue_a@12.34.56::EF:5060> |
| Other-Identities: | tel: +358-40-7618290, sip:Mary@chessclub-hel.org |

In step 2 of FIG. 4, the P-CSCF forwards the registration request to the contact point of the home network, i.e. an I-CSCF. The header of the message now looks as follows:

| | |
|---|---|
| REGISTER | home_a.com SIP/2.0 |
| Via: | SIP/2.0/UDP p_cscf.visited_a.com |
| Via: | SIP/2.0/UDP 12.34.56::EF:5060 |
| From: | Private Identity <sip:245454555@home_a.com> |
| To: | Mary Blue <sip:Mary.Blue@home_a.com> |
| Call-Id: | 12345@ue_a.home_a.com |
| Cseq: | 1 REGISTER |
| Contact: | User_A <sip:ue_a_12.34.56_EF_5060 @p_cscf.visited_a.com > |
| Other-Identities: | tel: +358-40-7618290, sip:Mary@chessclub-hel.org |

In step 3 of FIG. 4, the I-CSCF selects a suitable Serving-Call State Control Function (S-CSCF) for the subscriber based on the received registration request.

In step 4 of FIG. 4, the I-CSCF forwards the registration request to the selected S-CSCF. The header of the message now looks as follows:

| | |
|---|---|
| REGISTER | home_a.com SIP/2.0 |
| Via: | SIP/2.0/UDP i_cscf.home_a.com |
| Via: | SIP/2.0/UDP p_cscf.visited_a.com |
| Via: | SIP/2.0/UDP 12.34.56::EF:5060 |
| From: | Private Identity <sip:245454555@home_a.com> |
| To: | Mary Blue <sip:Mary.Blue@home_a.com> |
| Call-Id: | 12345@ue_a.home_a.com |
| Cseq: | 1 REGISTER |
| Contact: | User_A <sip:ue_a_12.34.56_EF_5060 @p_cscf.visited_a.com > |
| Other-Identities: | tel: +358-40-7618290, sip:Mary@chessclub-hel.org |

In step 5 of FIG. 4, the S-CSCF registers the address in the "To" header field as well as the addresses in the "Other-Identities" header field. Additionally, the S-CSCF removes public identities that couldn't be registered from the "Other-Identities" header field.

In step 6 of FIG. 4, the S-CSCF sends a 200OK SIP message as a response to the registration request to the I-CSCF. The header of the response message looks as follows:

| | |
|---|---|
| SIP/2.0 | 200 OK |
| Via: | SIP/2.0/UDP i_cscf.home_a.com |
| Via: | SIP/2.0/UDP p_cscf.visited_a.com |
| Via: | SIP/2.0/UDP 12.34.56::EF:5060 |
| From: | Private Identity <sip:245454555@home_a.com> |
| To: | Mary Blue <sip:Mary.Blue@home_a.com> |
| Call-Id: | 12345@ue_a.home_a.com |
| Cseq: | 1 REGISTER |
| Contact: | User_A <sip:ue_a_12.34.56_EF_5060 @p_cscf.visited_a.com > |
| Other-Identities: | tel: +358-40-7618290, sip:Mary@chessclub-hel.org |

In step 7 of FIG. 4, the I-CSCF forwards the 200OK response message to the P-CSCF. The header of the response message looks as follows:

| | |
|---|---|
| SIP/2.0 | 200 OK |
| Via: | SIP/2.0/UDP p_cscf.visited_a.com |
| Via: | SIP/2.0/UDP 12.34.56::EF:5060 |
| From: | Private Identity <sip:245454555@home_a.com> |
| To: | Mary Blue <sip:Mary.Blue@home_a.com> |
| Call-Id: | 12345@ue_a.home_a.com |
| Cseq: | 1 REGISTER |
| Contact: | User_A <sip:ue_a_12.34.56_EF_5060 @p_cscf.visited_a.com > |
| Other-Identities: | tel: +358-40-7618290, sip:Mary@chessclub-hel.org |

In step 8 of FIG. 4, the P-CSCF stores the names from the "To" header field and the "Other-Identities" header field.

Then, in step 9 of FIG. 4, the P-CSCF forwards the response message to the user equipment UE(A). The header of the response message looks as follows:

| | |
|---|---|
| SIP/2.0 | 200 OK |
| Via: | SIP/2.0/UDP 12.34.56::EF:5060 |
| From: | Private Identity <sip:245454555@home_a.com> |
| To: | Mary Blue <sip:Mary.Blue@home_a.com> |
| Call-Id: | 12345@ue_a.home_a.com |
| Cseq: | 1 REGISTER |
| Contact: | User_A <sip:ue_a@12.34.56::EF:5060> |
| Other-Identities: | tel: +358-40-7618290, sip:Mary@chessclub-hel.org |

Then the registration of the additional other public identities is completed.

In a second preferred embodiment, all public identities stored in subscriber database, e.g. the HSS, are registered if indicated in the user equipment. The user equipment, i.e. the user's terminal sends one of the valid public identities in the "To" header field of the REGISTER message and a flag, a suitable mark, a note or the like, e.g. in the header field "Other-identities" indicating that all public identities should be registered. The S-CSCF registers all public identities listed in the subscriber's profile contained in the subscriber database, i.e. the HSS. The S-CSCF returns the list of registered public identities in the "Other-Identities" header field to the P-CSCF. The P-CSCF stores the registered public identities for later use.

In a third preferred embodiment, all public identities stored in the subscribers database, i.e. the HSS, are registered by a default setting. The REGISTER message is send without the "Other-Identities" header field or any other indication. The S-CSCF registers all available public identities listed in the subscriber's profile stored in the HSS and returns the registered public identities to the P-CSCF in the "Other-Identities" header field, in the payload or in another appropriate way. The P-CSCF then stores the registered public identities for later use. In this "all in one registration by default" case, the subscriber may have defined beforehand, e.g. via a web page, a certain menu displayed on his terminal or the like, the identities and/or profiles included in the "default" set.

It is noted that the "Supported", "Require", and "Proxy-Require" header fields are not taken into account for the scope of this embodiment; however, it is quite likely that those may be used as well. Furthermore, considerations about the "Path" header field (as recently decided in 3GPP) are not taken into account for the scope of this embodiment for simplification reasons.

The subscriber might want to administrate his public identities himself to avoid being charged by the operator, to make changes quickly and smoothly and to feel to be his own master. It would be also easy to the operator to allow subscribers e.g. to change the list of public identities that are registered always by default at the registration; or to allow delete, change and create subprofiles and define their content in limits given by the operator.

To achieve this, the HSS database may or may not be divided into several subdatabases. If it is divided into subdatabases, some of the subdatabases can be edited by the subscriber, and others by the operator only. Thereby, the HSS is less vulnerable. If it is not divided into subdatabases, some part(s) of the database can be edited by the subscriber, and others by the operator only. The subscriber edits a temporal copy of his entry in the database. After editing the validity and the correctness of the change or the whole entry is checked. If no errors are found, the temporal copy of the subscribers entry replaces the old entry in the database or subdatabase. According to operator specified rules a new production version may then be generated of the database or the subdatabase(s). Because the HSS is a register of the services the subscriber has ordered, it is the proper place where subscriber can make changes when ordering/cancelling/deleting/changing a service. Furthermore, generating a DNS-ENUM (Domain Name System—E.-Number) database is easier because not the whole HSS database has to be searched. In case the HSS original database is divided into subdatabases, the generation can be done based on possibly only one subdatabase.

The subscriber's private key may be the key that is common in all subdatabases. The database/subdatabase may have three versions: the first is the original database, the second is the production version and the third is the temporal version where the subscriber makes changes to his own entry.

Thus, a new optional header (e.g. "Other-Identities") is introduced in the REGISTER message to convey the information what other public identities the user wants to register. Any other name can be used for the header field "Other-identities". The "From" field of the REGISTER message comprises the private identity and the "To" field one of the valid public identities of the subscriber. It doesn't matter which one of the valid public identities is used in the "To" field. In the "Other-identities" header field, there are listed the other public identities that the subscriber wants to register at the same time.

Network elements and terminals that don't understand the new optional header "Other-identities" leave it untouched. This feature cannot be utilized with them. As a further option, one or more of the items in the "Other-identities" optional header can be a profile instead of individual public identity. In that case, all public identities that are included in the listed profiles are registered, according to the concept "one private identity but several user profiles". Attributes, which modify the registration of individual profile or public identity, may be attached to profiles and even public identities listed in the "Other-identities" header field. If the user wants to attach attributes to the public identity used in the "To" field, the public identity can be repeated in the "Other-identities" header with appropriate attributes. The terminal or user equipment may insert the "Other-identities" header to the REGISTER message. The list of the valid profiles/public identities may be stored in the UMTS subscriber identity module (USIM) and/or in terminal's memory and/or it may be inserted by the user.

Instead of the new optional header "Other-identities" the same information could be conveyed in the payload of the REGISTER message.

It is assumed that the subscriber has registered with one of his identities. As a default setting, that identity can be used for incoming and outgoing calls. When the subscriber wants to use one of his other identities, he simply makes a call with it, i.e. sends an INVITE SIP message with the unregistered identity in the "From" header field. When the network element in charge of keeping track of the subscriber's identities, i.e. S-CSCF and/or P-CSCF, receives the INVITE message from the subscriber's terminal, it stores the INVITE message and sends a REGISTER message with the unregistered identity in order to register it. If the registration succeeds, the identity is registered for outgoing calls as a default setting and the network element proceeds with retrieving the INVITE message and sending it further. If the registration fails the call is released.

The subscriber may register or change his registration explicitly with whichever of his identities for incoming calls only, or for outgoing calls only, or for both by sending a REGISTER message with the identity in question and with an appropriate parameter(s). The subscriber's choice may be limited with master parameters in the HSS. Limiting factors can be e.g. the time, whether the bill is paid, and the direction (incoming/outgoing/both). The subscriber can do several registrations at the same time. With a certain parameter in the INVITE message, the registration may be done also for incoming calls, not only for outgoing calls (that may be a default setting). With another certain parameter in the REGISTER message all valid identities may be registered and received from HSS.

Some resolving functionality (e.g. Domain Name Server (DNS) or similar database or alike) is needed so that the network element in charge of keeping track of the subscriber's identities (i.e. S-CSCF and/or P-CSCF) can find the correct HSS for an identity in order to be able to route the REGISTER message towards the correct HSS.

As regards the "one private identity but several user profiles" case, the present invention can also be used together with user profiles. An operation targeted to a user profile has influence on all public identities which belong to that user profile.

In other words, a user profile is only a bundle of public identities. For example, when a user registers a user profile, all public identities under that profile are registered. A user profile may be addressed e.g. with one of its public identities.

Concerning the "several private identities" case, the present invention can also be used together with several private identities. An operation targeted to a private identity has influence on all public identities that belong to that private identity. In other words, a private identity is a bundle of public identities. The private identities of a subscriber can be bound together with one or more client identities that are used e.g. for charging.

In all cases, the subscriber may get a warning (if desired) about calls to his non-registered public identities.

In summary, the present invention describes a registration method wherein a user is registered in a communication network. According to a first aspect, a registration message is used, which comprises a header field for defining at least one other identity of the subscriber. According to a second aspect, a registration message is used, which comprises an identity information in its payload portion, said identity information defining at least one other identity of the subscriber. According to a third aspect, a one-by-one registration is performed based on an identity information stored at the terminal device, said identity information defining at least one other identity of the subscriber. Thus, the user or subscriber can register some or all of his public identities at once with one registration procedure. Furthermore, the subscriber can utilize his identities smoothly and easily, and at the same time prevent unwanted incoming calls. Additionally, the subscriber can utilize his public identities smoothly and easily by grouping the public identities under user profiles or under private identities.

It is noted that the present invention is not restricted to the above described preferred embodiments but can be applied in any registration procedure of any communication network, where a registration message comprising a user identity is transmitted from a terminal device to the communication network. The invention may thus vary within the scope of the attached claims.

The invention claimed is:

1. A method, comprising:

generating a session initiation protocol registration message defining a plurality of user identities of a user, the session initiation protocol registration message transmitted to an Internet Protocol multimedia service network, the session initiation protocol registration message comprising:

a To *message* header used to define a first user identity, a From message *header* used to define a second user identity, and a third dedicated header field used to define at least a third user identity, *wherein* the first user identity, the second user identity, and at least the third user identity [corresponding] *correspond* to the plurality of user identities; and transmitting the session initiation protocol registration message.

2. The method according to claim 1, further comprising:
returning a list of registered identities of said [subscriber] *user* from said [communication] *Internet Protocol multimedia service* network in a corresponding header field of a response message.

3. The method according to claim 2, wherein said returning comprises returning said list in said corresponding header field of said response message comprising a session initiation protocol 200 OK message.

4. The method according to claim 1, further comprising:
adding a direction information to said session initiation protocol registration message for conveying at least one registration direction for which at least the third user identity is valid.

5. The method according to claim 4, wherein said adding comprises adding said direction information comprising incoming calls, outgoing calls or both.

6. The method according to claim 4, wherein said adding comprises determining said direction information by a parameter, a header or a flag of said registration message.

7. The method according to claim 1, wherein said session initiation protocol registration message comprises an instruction that all valid identities of said user should be activated at the same time.

8. The method according to claim 7, wherein said transmitting said session initiation protocol registration message further comprises storing said instruction in a header field of said session initiation protocol registration message.

9. The method according to claim 7, wherein said transmitting said session initiation protocol registration message further comprises determining said instruction by a flag, a mark, or a note in said session initiation protocol registration message.

10. The method according to claim 1, wherein said transmitting comprises storing said at least the third user identity in a subscriber database.

11. The method according to claim 10, further comprising:
dividing said subscriber database into a plurality of subdatabases,
wherein at least one of said plurality of subdatabases can be edited by said subscriber, and at least one of said plurality of subdatabases can be edited by an operator only.

12. The method according to claim 10, wherein said storing comprises editing a predetermined part of said subscriber database by said subscriber, and editing another predetermined part of said subscriber database by an operator only.

13. The method according to claim 10, further comprising:
editing by said subscriber a temporal copy of a subscriber's entry in said subscriber database;
checking a validity and a correctness of said editing; and replacing said subscriber's entry when no errors are found in said temporal copy of subscriber's entry.

14. The method according to claim 1, wherein said transmitting comprises transmitting said session initiation protocol registration message defining said [identity] *plurality of identities* comprising a private identity of said user configured in a "From" header field of said session initiation protocol registration message, and said [identity] *plurality of identities* comprising valid public identity of said user configured in a "To" header field of said session initiation protocol registration message.

15. The method according to claim 1, further comprising:
defining an identity profile from the first user identity, the second user identity, and at least the third user identity corresponding to the plurality of user identities, the identity profile comprising a predetermined set of identities.

16. The method according to claim 15, further comprising:
storing a list of identity profiles in a subscriber identity module.

17. The method according to claim 15, further comprising:
attaching attributes for modifying said list of identity profiles to each said identity profile.

18. The method according to claim 15, wherein said defining comprises defining said identity profile comprising a predetermined set of public identities and defining said identity profile by a private identity.

19. The method according to claim 1, wherein said transmitting comprises inserting at least the third user identity into said registration message at a terminal device of said user.

20. The method according to claim 1, further comprising:
registering an unregistered one of the first user identity, the second user identity, and at least the third user identity corresponding to the plurality of user identities by a network element when a call is initiated by said user using said unregistered identity.

21. The method according to claim 20, wherein said registering comprises transmitting said unregistered identity to said network element in a "From" header field of a session initiation protocol invite message.

22. The method according to claim 1, further comprising:
storing a limiting information in a subscriber database, said limiting information comprising limiting factors for limiting registration choices of said user.

23. A method, comprising:
transmitting a session initiation protocol registration message defining a plurality of user identities of a user, the session initiation protocol registration message transmitted to an Internet Protocol multimedia service, the session initiation protocol registration message comprising:
a To *message* header used to define a first user identity,
a From message *header* used to define a second user identity, and
a third dedicated header field used to define at least a third user identity, *wherein* the first user identity, the second user identity, and at least the third user identity [corresponding] *correspond* to the plurality of user identities; and
registering at least one of the first user identity, the second user identity, and at least the third user identity of said user, stored in a subscriber database, by a default setting.

24. The method according to claim 23, wherein said registering comprises registering at least the third user identity of a default set defined by said user.

25. The method according to claim 24, wherein said registering further comprises registering at least the third user identity of said default set defined via a web page or a terminal menu.

26. The method according to claim 23, further comprising:
issuing a warning about calls to non-registered public identities to said user.

27. A system, comprising:
a terminal device configured to transmit a session initiation protocol registration message comprising a plurality of user identities of a user, the session initiation protocol registration message transmitted to an Internet Protocol multimedia service, the session initiation protocol registration message comprising:
a To *message* header used to define a first user identity,
a From message *header* used to define a second user identity, and
a third dedicated header field used to define at least a third user identity, *wherein* the first user identity, the second user identity, and at least the third user identity [corresponding] *correspond* to the plurality of user identities; and a network element configured to detect at least the third user identity, and further configured to register at least the third user identity.

28. The system according to claim 27, wherein said network element is a call state control function of said communication network.

29. An apparatus comprising:

a [transmitter] *generator* configured to [transmit] *generate* a session initiation protocol registration message comprising a plurality of user identities of a user, the session initiation protocol registration message transmitted to an Internet Protocol multimedia service, the session initiation protocol registration message comprising:

a To *message* header used to define a first user identity, a From message *header* used to define a second user identity, and a third dedicated header field used to define a third user identity, *wherein* the first user identity, the second user identity, and at least the third user identity [corresponding] *correspond* to the plurality of user identities; *and*

[a detector configured to detect said at least one of the plurality of user identities; and a registration device configured to register at least the third user identity, wherein at least one of the transmitter, the detector, and the registration service are implemented on a processor of a user equipment] *a transmitter configured to transmit the session initiation protocol registration message*.

30. The apparatus of claim 29, wherein the session initiation protocol registration message comprises direction information to convey at least one registration direction for which said at least one other identity is valid.

31. The apparatus of claim 29, wherein the session initiation protocol registration message comprises direction information comprising incoming calls, outgoing calls or both.

32. The apparatus of claim 29, wherein the session initiation protocol registration message comprises direction information comprising a parameter, a header or a flag of the session initiation protocol registration message.

33. The apparatus of claim 29, wherein the transmitter is further configured to transmit the session initiation protocol registration message comprising an instruction that all valid identities of the user should be activated at the same time.

34. The apparatus of claim 33, wherein the transmitter is further configured to store said instruction in a header field of said session initiation protocol registration message.

35. The apparatus of claim 33, wherein the transmitter is further configured to determine the instruction by a flag, a mark or a note in the session initiation protocol registration message.

36. The apparatus of claim 29, wherein the transmitter is further configured to transmit said registration message defining said [identity] *plurality of identities* comprising a private identity of said user configured in a "From" header field of said session initiation protocol registration message, and said [identity] *plurality of identities* comprising valid public identity of said user configured in a "To" header field of said session initiation protocol registration message.

37. An apparatus comprising:

means for transmitting a session initiation protocol registration message comprising a plurality of user identities of a user, the session initiation protocol registration message transmitted to an Internet Protocol multimedia service, the session initiation protocol registration message comprising:

a To *message* header used to define a first user identity, a From message *header* used to define a second user identity, and a third dedicated header field used to define a third user identity, *wherein* the first user identity, the second user identity, and at least the third user identity [corresponding] *correspond* to the plurality of user identities;

means for detecting said at least one of the plurality of user identities; and means for registering said at least one of the plurality of user identities, wherein at least one of the means for transmitting, the means for detecting, and the means for registering are implemented on a processor.

*38. A method, comprising:*

*receiving a session initiation protocol registration message defining a plurality of user identities of a user, the session initiation protocol registration message transmitted to an Internet Protocol multimedia service network, the session initiation protocol registration message comprising:*

*a To message header used to define a first user identity,*

*a From message header used to define a second user identity, and*

*a third dedicated header field used to define at least a third user identity, wherein the first user identity, the second user identity, and at least the third user identity correspond to the plurality of user identities; and*

*transmitting a response to the received session initiation protocol registration message.*

*39. An apparatus comprising:*

*a receiver configured to receive a session initiation protocol registration message comprising a plurality of user identities of a user, the session initiation protocol registration message transmitted to an Internet Protocol multimedia service, the session initiation protocol registration message comprising:*

*a To message header used to define a first user identity,*

*a From message header used to define a second user identity, and*

*a third dedicated header field used to define at least a third user identity, wherein the first user identity, the second user identity, and at least the third user identity correspond to the plurality of user identities; and*

*a transmitter configured to transmit a response to the received session initiation protocol registration message.*

* * * * *